Figure 1:
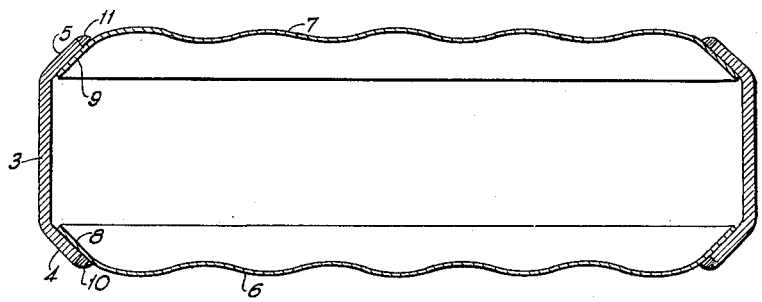

Feb. 16, 1937.    W. A. REICHEL    2,070,751
EXPANSIBLE DIAPHRAGM AND METHOD OF MAKING SAME
Filed Jan. 22, 1932

INVENTOR
Wladimir A. Reichel.
BY Stephen Gerstvik
ATTORNEY

Patented Feb. 16, 1937

2,070,751

UNITED STATES PATENT OFFICE 2,070,751

EXPANSIBLE DIAPHRAGM AND METHOD OF MAKING SAME

Wladimir A. Reichel, Brooklyn, N. Y., assignor to Bendix Aviation Corporation, South Bend, Ind., a corporation of Delaware Application January 22, 1932, Serial No. 588,223

4 Claims. (Cl. 137—156)

The present invention relates to expansible and contractible diaphragm devices and to a method of making the same.

Diaphragm devices embodying the invention are particularly suitable for use in certain types of precision measuring instruments, such as sensitive pressure gauges, aneroid barometers, hydrostatic fuel-level gauges, air speed indicators, altimeters, rate of climb instruments, and in any other instruments employing a pressure sensitive element.

A common method employed heretofore, in making diaphragm devices of the above type was to unite together two flexible metallic diaphragms having rim portions extending axially of the diaphragm device and out of the planes of the diaphragms in overlapping relation.

Another common method was to connect and seal the peripheral edges of the diaphragms to an immediate cooperating shell structure in such a manner that in operation the sealed connection was stretched or strained in tension, i. e., when a pressure was exerted inside of the diaphragm device the peripheral edges tended to pull away from the supporting shell, thereby tending to break the sealed connection between the diaphragms and the shell.

In the first method it has been endeavored to make and maintain the diaphragm devices airtight by sealing the two overlapping rims of the diaphragms, and in the second method by sealing the peripheral edges of the diaphragms to the exterior surface of the supporting shell. It has been frequently found, however, that expansible diaphragm devices made in accordance with the first method failed because of leaks occurring as a result of the parting of the bond between the sealed rim portions, and those made in accordance with the second method generally failed because of hysteresis errors produced by the stretching of the sealed connection. In instruments of the type referred to above such leaks and hysteresis errors present a serious problem and are largely responsible for many of the inaccuracies prevalent in such instruments, thereby impairing or completely destroying their efficiency as precision instruments. In an altimeter, for example, these errors may amount to several hundred feet which would render the instrument wholly unreliable and might even be the cause of very serious results following reliance upon the reading of such a defective instrument particularly in an aircraft during a maneuver. Consequently it is of the greatest importance that diaphragm devices be so made as to be able to withstand vigorous tests and extreme conditions, such as are due to high vibration and changes in pressures and temperature to which aeronautical instruments particularly are subjected.

Accordingly one of the objects of the present invention is to provide a novel and improved construction of diaphragm devices and a novel method of making the same, whereby the foregoing difficulties are substantially eliminated and whereby instruments embodying such diaphragm devices are rendered more precise.

Another object of the invention is to provide in an expansible and contractible diaphragm device a novel sealed connection which is not stretched, strained nor disturbed in any manner during normal operation of the diaphragms constituting the diaphragm device, thereby preventing errors due to leaks and hysteresis.

Another object is to provide a novel expansible and contractible diaphragm device which has its oppositely disposed diaphragms secured to a supporting shell by a sealed connection in such a manner that the force created by the pressure preponderating inside of the device tends to press the peripheral edges of the diaphragm against the shell rather than away from it so that the sealed connection is compressed instead of stretched whereby delayed restitution or hysteresis is prevented and the possibility of leaks substantially eliminated.

Still another object is to provide a novel method of making expansible diaphragm devices which method comprises, forming a pair of corrugated flexible diaphragms so as to have inturned peripheral flanges, securing said diaphragms to a supporting shell in such a manner that the peripheral flanges of the diaphragms abut against the interior of the shell, and placing sealing material, such as solder, at the place where the exterior surfaces of the diaphragm flanges abut against the interior surface of the supporting shell so that the preponderating pressure inside of the box tends to press the flanges of the diaphragms against the supporting shell without disturbing the sealing material.

The above and other objects and advantages of the invention will appear more fully hereinafter from a consideration of the detailed description which follows, taken together with the accompanying drawing wherein are illustrated two embodiments of the invention. It is to be expressly understood, however, that the drawing is merely for the purpose of illustration and description and is not designed as a definition of the limits of the invention, reference being had for this purpose to the appended claims.

Figure 2:
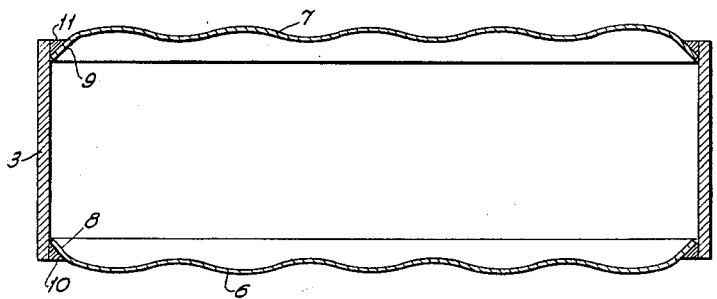

In the drawing wherein like reference numerals refer to like parts in the two views, Fig. 1 is a sectional view showing one form of diaphragm device embodying the present invention; and Fig. 2 is a sectional view showing another embodiment of the invention.

The diaphragm device embodying the invention is constituted by a supporting member or shell, preferably cylindrical and a pair of oppositely disposed metallic diaphragms which have their peripheral edges secured to said supporting shell. In the form shown in Fig. 1 of the drawing the supporting shell comprises a cylindrical member 3 having flange portions 4 and 5 projecting inwardly at a suitable angle to provide an annular reinforcing wall against which the diaphragms are adapted to press when there exists a preponderating pressure inside of the diaphragm device. The diaphragms, which may be of any suitable flexible material and preferably of thin sheet copper, are indicated at 6 and 7 and are corrugated in the usual manner to provide the required flexibility. The diaphragms are also formed, as by stamping, so as to have peripheral or rim flange portions 8 and 9 projecting out of the planes thereof and at an angle corresponding to the angle at which the flanges 4 and 5 of the supporting shell 3 are turned inwardly. The diaphragms 6 and 7 are arranged against the supporting shell 3 in such a manner that the exterior surfaces of the flanges 8 and 9 abut against the interior surfaces of the flanges 4 and 5, respectively, thereby providing a relation between the diaphragms and their supporting shell such that the former press against the latter during normal operation of the diaphragm device.

It is pointed out that in the forming of the diaphragm device, first one flange, as for example the flange 4, is turned in and the diaphragm 6 positioned thereagainst, and after diaphragm 6 is secured to the shell then the other diaphragm 7 is inserted into the shell 3 with its peripheral flange 9 extending inwardly of the device and the peripheral edge of the shell 3 is then bent or spun to provide the peripheral flange 5 which corporates with flange 9 of the diaphragm 7. The diaphragms are secured to the shell in any suitable manner as, for example, by placing suitable sealing material, such as solder, between the inner edges of the shell flanges 4 and 5 and the outer face of the diaphragm flanges 8 and 9 to form two annular sealed connections indicated at 10 and 11. It will be noted from this arrangement that the sealed connections 10 and 11 can not be stretched or strained when movements of the diaphragms 6 and 7 occur due to preponderance of pressure inside of the diaphragm device over the pressure outside of the device as is the case in instruments in which expansible diaphragm devices of this type are employed, the reason for this being that the flanges 4 and 5 of the supporting shell provide a reinforcement whereby the diaphragm bear against the shell during operation instead of pulling away therefrom as is the case in diaphragm devices of prior construction.

Referring to Fig. 2 wherein there is illustrated another form of expansible and contractible diaphragm devices, the supporting shell 3 is cylindrical as in Fig. 1, but is not provided with any peripheral flanges. The diaphragms 6 and 7 are again formed to have peripheral flanges 8 and 9, but the width thereof is slightly less than that of the flanges shown in Fig. 1. The edges of the flanges 8 and 9 abut against the interior wall of the shell 3 so as to form an annular acute angular space therebetween for receiving the sealing material, such as solder, which forms the annular air-tight connections 10 and 11. Hence, when there is a preponderance of inside pressure over outside pressure of the diaphragm device 10 the annular seals 10 and 11 are not stretched nor strained in tension and the forces acting on the sealed connection are forces of compression so that very little, if any, distortion or disruption of the seals occurs, with the result that the amount of restitution, and therefore hysteresis, is greatly reduced and the possibility of leaks is substantially eliminated, the solder acting as a seal between the diaphragms 6 and 7 and the supporting shell 3.

There is thus provided a novel and improved expansible diaphragm device having the diaphragms thereof so arranged that there is no tendency of disruption of the seal between said diaphragms and the supporting shell to which they are secured. The annular sealing connection between the supporting shell and the diaphragms is also situated and joined thereto so that movements of the diaphragms due to changes of preponderating internal pressure within the diaphragm device does not stretch the sealing material of the connection. The diaphragm flange portion extends inwardly of the bounding shell at an angle defining with said shell an obtuse angle at the preponderating pressure side, and the diaphragm flange portion is soldered to the shell in such a way that the solder is not stretched or subjected to tension due to diaphragm movements occasioned by changes in such preponderating pressure.

While two forms of expansible diaphragm devices embodying the invention have been illustrated and described, other changes in the form and construction thereof, which will now appear to those skilled in the art, may be made without departing from the scope of the invention, reference being had to the appended claims for a definition of the limits of the invention.

What is claimed is:

1. An expansible diaphragm device comprising means providing a chamber and including a supporting shell, a diaphragm closing said chamber and movable in response to a difference in pressure at opposite sides of the diaphragm, said diaphragm having a peripheral flange portion inclined at an angle toward the normally preponderating pressure side of said diaphragm, and an annular connection between said flange portion and the shell, said connection comprising sealing material within the annular space defined by the peripheral edge of the shell and the inclined flange portion of the diaphragm so that the sealing material is not susceptible to tension due to movements of the diaphragm occasioned by pressure preponderance changes of the device as long as the normal relation or direction of preponderance is maintained.

2. An expansible diaphragm device comprising means providing a chamber and including a supporting shell, a diaphragm closing the chamber and movable normally in response to changes in preponderance of inside pressure over outside pressure, said diaphragm having an inwardly inclined flange portion, and an annular sealed connection consisting of sealing material disposed in the acute annular space formed by the flange portion of the diaphragm and the shell whereby the sealing material of such connection is not stretched due to movements of the diaphragm occasioned by changes in preponderance of inside pressure over outside pressure of the device.

3. An expansible diaphragm device comprising means providing a chamber and including a cylindrical supporting shell having an inturned flange, a diaphragm closing the chamber and movable normally in response to differences in pressure at opposite sides of the diaphragm, said diaphragm also having an inturned annular flange portion seated against the inner face of the flange of the shell, and an annular sealed connection between the edge of the flange and the exterior surface of the flange portion of the diaphragm whereby the sealing material of such connection is not stretched due to movements of the diaphragm occasioned by changes in preponderating pressure of the device as long as the normal relation of direction or preponderance is maintained.

4. An expansible diaphragm device comprising means providing a chamber and including a cylindrical supporting shell having oppositely disposed inwardly extending annular flanges, a pair of oppositely disposed diaphragms closing the chamber and movable normally in response to changes in preponderance of inside pressure over outside pressure, each of said diaphragms having an inwardly extending peripheral flange portion seating against the interior face of the shell flanges, respectively, and annular sealed connections between the edges of the shell flanges and the exterior surfaces of the diaphragm flange portions, respectively, whereby the sealing material of such connections is not stretched due to movements of the diaphragms occasioned by changes in preponderance of inside pressure over outside pressure of the device.

WLADIMIR A. REICHEL.